United States Patent
King et al.

(10) Patent No.: US 7,543,281 B2
(45) Date of Patent: Jun. 2, 2009

(54) DISABLING AND CONDITIONALLY COMPILING GRAPHICAL CODE IN A GRAPHICAL PROGRAM

(75) Inventors: Jason King, Austin, TX (US); Kevin Hogan, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1121 days.

(21) Appl. No.: 10/200,560

(22) Filed: Jul. 22, 2002

(65) Prior Publication Data

US 2004/0012632 A1    Jan. 22, 2004

(51) Int. Cl.
G06F 9/45    (2006.01)
(52) U.S. Cl. .................. 717/140; 717/105; 717/113
(58) Field of Classification Search .......... 717/140, 717/113; 715/763, 771
See application file for complete search history.

(56) References Cited

U.S. PATENT DOCUMENTS

| | | | | |
|---|---|---|---|---|
| 5,204,960 A * | 4/1993 | Smith et al. | ................. | 717/145 |
| 5,437,007 A * | 7/1995 | Bailey et al. | ................. | 715/763 |
| 5,481,741 A * | 1/1996 | McKaskle et al. | ........... | 345/522 |
| 5,509,116 A * | 4/1996 | Hiraga et al. | .................. | 707/1 |
| 5,590,330 A * | 12/1996 | Coskun et al. | ............. | 717/126 |
| 5,732,277 A | 3/1998 | Kodosky et al. | | |
| 5,777,616 A * | 7/1998 | Bates et al. | ................. | 715/837 |
| 5,812,850 A * | 9/1998 | Wimble | ....................... | 717/131 |
| 5,815,154 A * | 9/1998 | Hirschtick et al. | .......... | 715/853 |
| 5,999,192 A * | 12/1999 | Selfridge et al. | ............ | 345/440 |
| 6,173,438 B1 * | 1/2001 | Kodosky et al. | ............. | 717/109 |
| 6,219,628 B1 * | 4/2001 | Kodosky et al. | ............... | 703/2 |
| 6,226,787 B1 * | 5/2001 | Serra et al. | .................. | 717/125 |
| 6,269,475 B1 * | 7/2001 | Farrell et al. | ................ | 717/113 |
| 6,308,320 B1 * | 10/2001 | Burch | ........................ | 717/154 |
| 6,335,745 B1 * | 1/2002 | Amro et al. | ................. | 715/835 |
| 6,378,066 B1 * | 4/2002 | Lewis | ........................ | 712/236 |

(Continued)

FOREIGN PATENT DOCUMENTS

FR    2701322 A1 *    8/1994

(Continued)

OTHER PUBLICATIONS

Beguelin, Adam; Dongarra, Jack; Geist, Al; Sunderam, Vaidy; "Visualization and Debugging in a Heterogeneous Environment", p. 88-95, 1993 IEEE retrieved Jul. 26, 2005.*

(Continued)

*Primary Examiner*—Wei Y Zhen
*Assistant Examiner*—Matthew J Brophy
(74) *Attorney, Agent, or Firm*—Meyertons Hood Kivlin Kowert & Goetzel, P.C.; Jeffrey C. Hood; Jason L. Burgess

(57) ABSTRACT

One embodiment of the present invention relates to disabling graphical code in a graphical program. A first portion of the graphical program may be disabled, which may include preventing the first portion of the graphical program from being compiled and/or preventing the first portion of the graphical program from being executed. Another embodiment of the invention relates to conditionally compiling graphical code in a graphical program. A first portion of the graphical program may be compiled if one or more associated conditions are true, or may not be compiled otherwise.

111 Claims, 7 Drawing Sheets

U.S. PATENT DOCUMENTS

| | | | |
|---|---|---|---|
| 6,412,106 B1 * | 6/2002 | Leask et al. | 717/124 |
| 6,625,805 B1 * | 9/2003 | Lam et al. | 717/130 |
| 6,643,769 B1 * | 11/2003 | Huck et al. | 712/227 |
| 6,724,409 B1 * | 4/2004 | Maddocks et al. | 715/853 |
| 6,784,903 B2 * | 8/2004 | Kodosky et al. | 715/771 |
| 6,792,595 B1 * | 9/2004 | Storistenau et al. | 717/110 |
| 7,062,718 B2 * | 6/2006 | Kodosky et al. | 715/771 |
| 2002/0129333 A1 * | 9/2002 | Chandhoke et al. | 717/107 |
| 2002/0157086 A1 * | 10/2002 | Lewis et al. | 717/127 |
| 2003/0095143 A1 * | 5/2003 | Lauris | 345/762 |
| 2004/0012632 A1 * | 1/2004 | King et al. | 345/763 |

FOREIGN PATENT DOCUMENTS

WO  WO9909473 A1 * 2/1999

OTHER PUBLICATIONS

Beshers, Clifford; Feiner, Steven; "Generating Efficient Virtual World for Visualization Using Partial Evaluation and Dynamic Compilation", p. 107-115, 1997 ACM, retrieved Jul. 26, 2005.*

Golin, Eric J; Feng, Annette C; Huang, Linus; Hughes; Hughes, Eric; "A Visual Design Environment", p. 364-367, 1993 IEEE, retrieved Jul. 26, 2005.*

Kunz, Thomas; Seuren, Michiel F H; "Fast detection of communication patterns in distributed executions", Abstract only, ACM 1997, retrieved Jul. 26, 2007.*

Philip Dean Lapsley, "Host Interface and Debugging of Dataflow DSP Systems", Thesis, 1991, pp. 1-51.

Lee et al., "Gabriel: A Design Environment for Programmable DSPs", 1988, pp. 1-11.

Lee et al., "Gabriel: A Design Environment for DSP", IEEE Transactions on Acoustics, Speech, and Signal Processing, vol. 37, No. 11, Nov. 1989, pp. 1751-1762.

Bier et al., "Gabriel: A Design Environment for DSP", IEEE Micro Issue—vol. 10, No. 5, 1990, pp. 28-45.

* cited by examiner

DISABLING AND CONDITIONALLY COMPILING GRAPHICAL CODE IN A GRAPHICAL PROGRAM

FIELD OF THE INVENTION

The present invention relates to the field of graphical programming, and more particularly to a system and method for disabling graphical code in a graphical program and/or conditionally compiling graphical code in a graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

SUMMARY

One embodiment of the present invention relates to disabling graphical code in a graphical program. The graphical program may include graphical code, such as a plurality of interconnected nodes that visually indicate functionality of the graphical program. A first portion of the graphical program may be disabled, which may include preventing the first portion of the graphical program from being compiled and/or preventing the first portion of the graphical program from being executed, as described below.

In one embodiment, the first portion of the graphical program may be disabled in response to direct user input. The user may request to disable the first portion of the graphical program or may configure the first portion of the graphical program to be disabled in any of various ways. For example in one embodiment, the user may first select the first portion of the graphical program and may then request to disable the selected portion, e.g., by invoking a menu command, keyboard command, or a command based on other input.

In another embodiment, the graphical programming development environment may provide a specific graphical program element or object designed for disabling graphical code. Such a graphical program element or object is also referred to herein as a code disable structure. The user may configure the first portion of the graphical program to be disabled by including a code disable structure in the graphical program and associating the first portion of the graphical program with the code disable structure.

In various embodiments, the code disable structure may have any of various appearances, and the user may associate the first portion of the graphical program with the code disable structure in any of various ways. For example, in one embodiment, the code disable structure may be displayed in the graphical program as a box or other object that bounds a particular area. The user may then position nodes or other graphical program elements of the first portion of the graphical program within the code disable structure. Any graphical code displayed within the code disable structure may not be compiled and/or may not be executed, as described below.

In another embodiment, the first portion of the graphical program may not be disabled in response to direct user input, but may be programmatically disabled. For example, in a case in which an application programming interface (API) is used to programmatically generate a graphical program, the graphical program may be generated so that a first portion of the graphical program is disabled.

A graphical indication may be displayed to visually indicate that the first portion of the graphical program is disabled, e.g., that the first portion of the graphical program is not to be compiled and/or executed. In various embodiments, displaying the graphical indication may include displaying any of various types of objects or information in the graphical program, or may include altering the appearance of the graphical program or of the first portion of the graphical program in any of various ways to indicate to the user that the first portion of the graphical program is disabled. The particular technique used to display the graphical indication may depend on the particular technique used to disable the first portion of the graphical program. For example, disabling the first portion of the graphical program may itself entail displaying the graphical indication. For example, as described above, in disabling the first portion of the graphical program, a user may position the first portion of the graphical program within a graphical program element such as a code disable structure. Thus, the code disable structure itself may visually indicate that any graphical code within the code disable structure is disabled. As another example, the user may draw one or more lines to separate the first portion of the graphical program from other portions of the graphical program, or such lines may be drawn automatically, e.g., in response to the user requesting the first portion of the graphical program to be disabled. Thus, these lines may visually indicate that the first portion of the graphical program is disabled. The lines may include one or more vertical lines and/or one or more horizontal lines or lines in other orientations.

In other cases, the visual appearances of disabled nodes, icons, or other elements in the first portion of the graphical program may be altered in various ways to visually indicate that they are disabled. For example, nodes or icons in the first portion of the graphical program may be dimmed, icon colors may be changed, etc.

Information representing the graphical program may be stored. For example, data structures and/or files representing the graphical program may be stored. The stored information may include information specifying that the first portion of the graphical program is disabled.

The graphical program may then be compiled and/or executed. For example, in one embodiment, the graphical programming development environment may be operable to compile graphical programs to produce executable code. Disabling the first portion of the graphical program may include preventing the graphical programming development environment from compiling the first portion of the graphical program when the graphical program is compiled. Thus, the first portion of the graphical program may not be executed either when the graphical program is executed.

In another embodiment, the first portion of the graphical program may still be compiled, but compiling the graphical program may generate executable code that is not executable to perform functionality of the first portion of the graphical program. In this instance, executable program instructions corresponding to the first portion of the graphical program may be generated when the executable code for the graphical program is generated, but the executable code for the graphical program may be structured or altered in such a way that the program instructions corresponding to the first portion of the graphical program will never actually execute during execution of the graphical program.

In another embodiment, the graphical program may be executed without compiling the graphical program. For example, the graphical programming development environment may be operable to interpret the graphical program for execution. In this case, the graphical program may be executed in such a way that the first portion of the graphical program does not execute during execution of the graphical program.

Another embodiment of the invention relates to conditionally compiling graphical code in a graphical program. The graphical program may include graphical code, such as a plurality of interconnected nodes that visually indicate functionality of the graphical program. One or more conditions may be associated with a first portion of the graphical program. In various embodiments, the first portion of the graphical program may be specified or selected in any of various ways, e.g., using techniques similar to those described above. Also, in various embodiments, the one or more conditions may be specified in any of various ways and may be associated with the first portion of the graphical program in any of various ways.

A graphical indication visually indicating that the first portion of the graphical program is to be conditionally compiled based on the one or more associated conditions may be displayed. In various embodiments, the graphical indication may be displayed in any of various ways, e.g., using techniques similar to those described above. In one embodiment, the conditions associated with the first portion of the graphical program may be displayed together with the first portion of the graphical program.

In one embodiment, the graphical programming development environment may provide a specific graphical program element or object designed for conditionally compiling graphical code. Such a graphical program element or object is also referred to herein as a conditional compilation structure. The user may configure the first portion of the graphical program to be conditionally compiled by including a conditional compilation structure in the graphical program and associating the first portion of the graphical program with the conditional compilation structure.

In various embodiments, the conditional compilation structure may have any of various appearances, and the user may associate the first portion of the graphical program with the conditional compilation structure in any of various ways. For example, in one embodiment, the conditional compilation structure may be displayed in the graphical program as a box or other object that bounds a particular area. The user may then position nodes or other graphical program elements of the first portion of the graphical program within the conditional compilation structure. The conditional compilation structure may allow the user to view and specify the one or more conditions to associate with the first portion of the graphical program. Any graphical code displayed within the conditional compilation structure may be conditionally compiled, based on the one or more conditions.

Information representing the graphical program may be stored. For example, data structures and/or files representing the graphical program may be stored. The stored information may include information specifying that the first portion of the graphical program is to be conditionally compiled, as well information specifying the associated conditions.

The graphical program may then be compiled. Compiling the graphical program may include determining whether the one or more conditions associated with the first portion of the graphical program are true. The first portion of the graphical program may be compiled if the one or more associated conditions are true. Otherwise, the first portion of the graphical program may not be compiled.

BRIEF DESCRIPTION OF THE DRAWINGS

A better understanding of the present invention can be obtained when the following detailed description of the preferred embodiment is considered in conjunction with the following drawings, in which.

Figure 1:
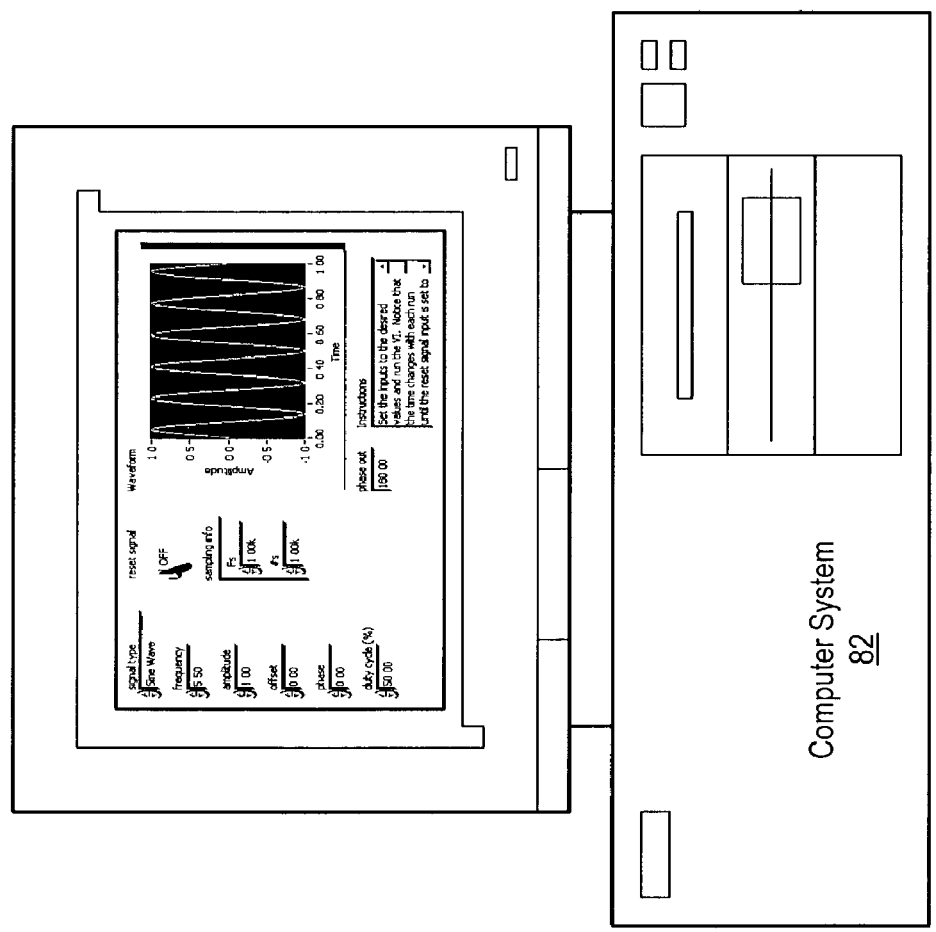
FIG. 1 illustrates a computer system 82 operable to execute a graphical programming development environment for creating a graphical program.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

INCORPORATION BY REFERENCE

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. patent application Ser. No. 09/617,600 titled "Graphical Programming System with Distributed Block Diagram Execution and Front Panel Display," filed Jun. 13, 2000.

U.S. patent application Ser. No. 09/745,023 titled "System and Method for Programmatically Generating a Graphical Program in Response to Program Information," filed Dec. 20, 2000.

U.S. patent application Ser. No. 09/886,456 titled "System and Method for Programmatically Creating Graphical Program Code in a Graphical Program," filed Jun. 20, 2001.

U.S. patent application Ser. No. 10/094,198 titled "Self-Determining Behavior Node for Use in Creating a Graphical Program," filed Mar. 8, 2002.

The LabVIEW and BridgeVIEW graphical programming manuals, including the "G Programming Reference Manual", available from National Instruments Corporation, are also hereby incorporated by reference in their entirety.

FIG. 1—Computer System

FIG. 1 illustrates a computer system 82 operable to execute a graphical programming development environment for creating a graphical program. According to one embodiment, the graphical programming development environment may enable the user to disable a portion of graphical code in a graphical program. Disabling the portion of graphical code may prevent the portion of graphical code from being compiled and/or may prevent the graphical code from being executed. A graphical indication visually indicating that the portion of graphical code is disabled may be displayed when the graphical program is displayed, e.g, when the graphical program is displayed as the user edits, views, or debugs the graphical program.

According to another embodiment, the graphical programming development environment may enable the user to specify a portion of graphical code in the graphical program to be conditionally compiled. For example, the user may associate one or more conditions with the portion of graphical code. When the graphical program is compiled, the one or more conditions may be evaluated. The portion of graphical code may be compiled if the one or more conditions are true, or may not be compiled otherwise. A graphical indication visually indicating that the portion of graphical code is to be conditionally compiled may be displayed when the graphical program is displayed, e.g, when the graphical program is displayed as the user edits, views, or debugs the graphical program.

In one embodiment, the computer system 82 may also execute the graphical program, where the graphical program was created on the computer system 82 or on a different computer system. In one embodiment, in executing the graphical program, a portion of the graphical program that is disabled may be prevented from executing, or executable program instructions corresponding to the disabled portion of the graphical program may not even be present, e.g., if the disabled portion of the graphical program was not compiled. In another embodiment, the graphical program may not be executable to perform a portion of the graphical program that is specified to be conditionally compiled, e.g., if the associated one or more conditions with that portion of the graphical program were not true when the graphical program was compiled.

The computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

As shown in FIG. 1, the computer system 82 may include a display device operable to display the graphical program as the graphical program is created and/or executed. The display device may also be operable to display a graphical user interface or front panel of the graphical program, e.g., during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store a graphical programming development environment application which enables the user to disable one or more portions of a graphical program and/or enables the user to specify one or more portions of the graphical program for conditional compilation. The memory medium may also or alternatively store one or more graphical programs created using the graphical programming development environment, e.g., a graphical program including one or more disabled portions or one or more portions specified for conditional compilation. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

In the present application, the term "graphical program" or "block diagram" is intended to include a program including graphical code. For example, the graphical code may comprise two or more interconnected nodes or icons, wherein the interconnected nodes or icons may visually indicate the functionality of the graphical program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons that visually indicate the functionality of the program.

A graphical program may also include a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical programming development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In the preferred embodiment, the system uses the LabVIEW graphical programming system available from National Instruments.

Figure 2A:
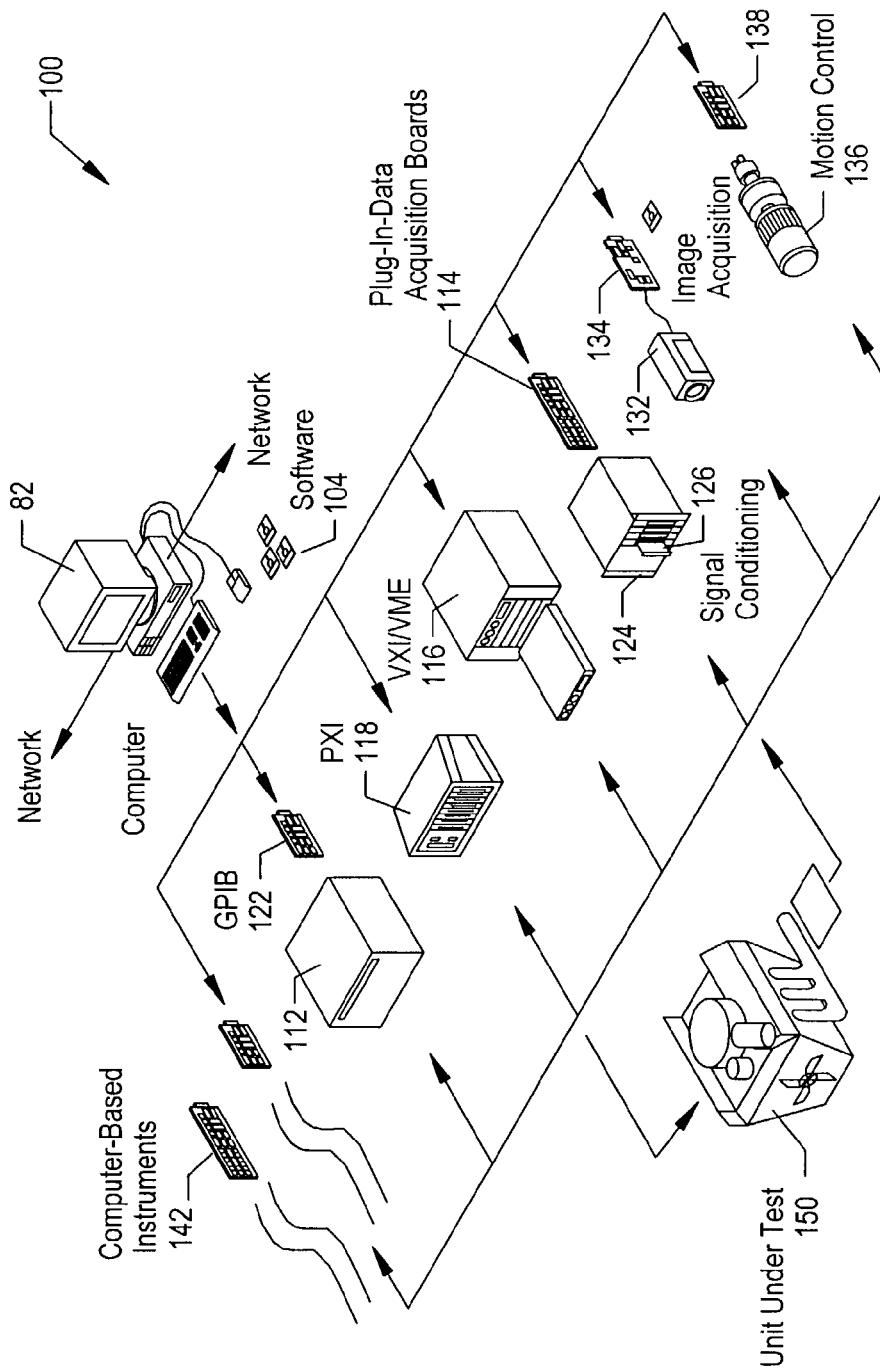
FIG. 2A illustrates an instrumentation control system according to one embodiment of the invention.
Figure 2B:
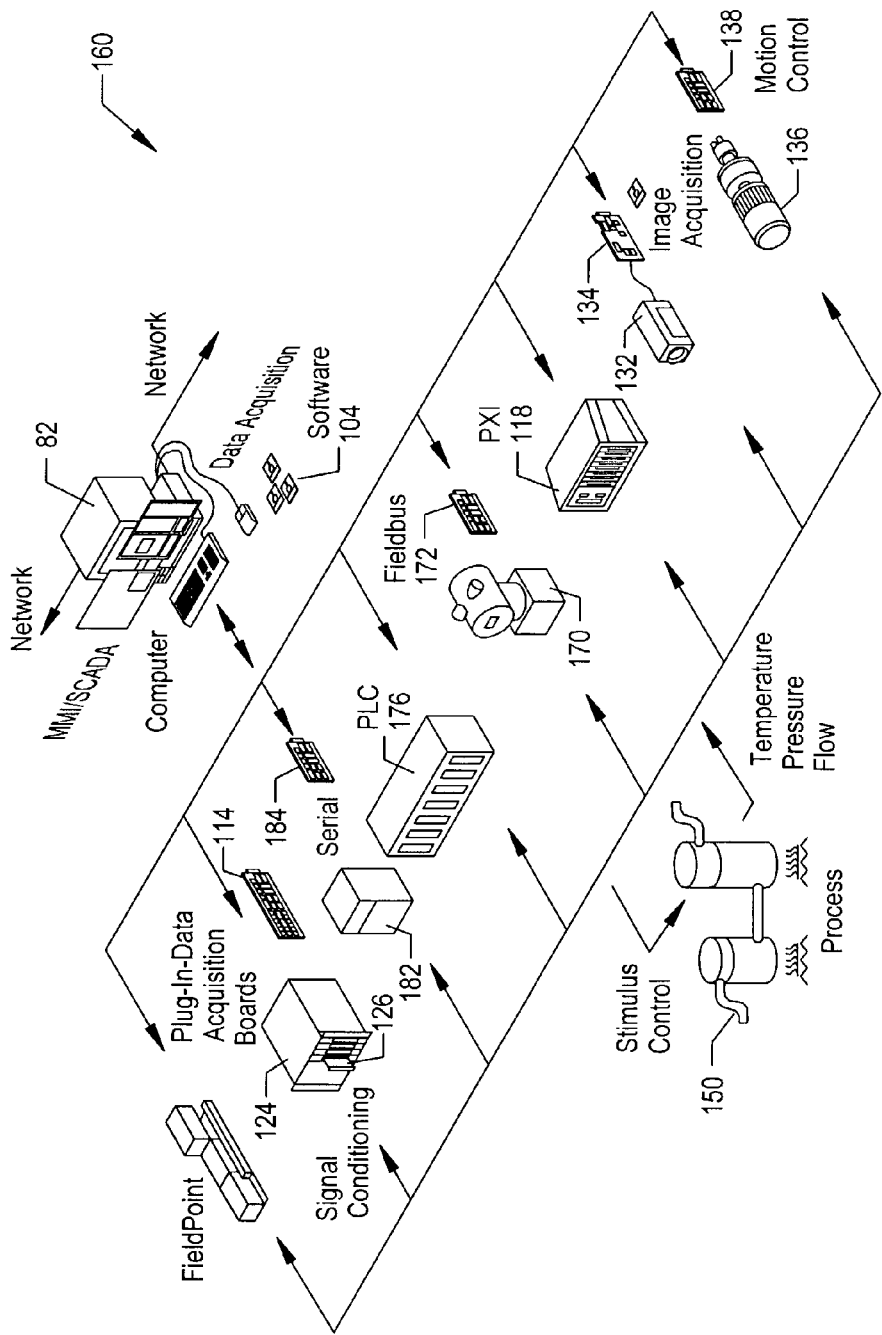
FIG. 2B illustrates an industrial automation system according to one embodiment of the invention.

FIGS. 2A and 2B—Instrumentation and Industrial Automation Systems

The following describes embodiments of the present invention involved with performing test and/or measurement functions and/or controlling and/or modeling instrumentation or industrial automation hardware. However, it is noted that the present invention can be used for a plethora of applications and is not limited to instrumentation or industrial automation applications. In other words, the following description is exemplary only, and the present invention may be used in conjunction with any of various types of systems. Thus, embodiments of the present invention may be applied to any of various types of applications, including applications related to the control of other types of devices such as multimedia devices, video devices, audio devices, telephony devices, Internet devices, etc., as well as general purpose software applications such as word processing, spreadsheets, network control, games, etc.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. In one embodiment, the computer 82 may execute a graphical program operable to interact with the one or more instruments, e.g., to analyze, measure or control a unit under test (UUT) or process 150.

In one embodiment, when the graphical program is created, one or more portions of the graphical program may be marked for conditional compilation. As one example, the graphical program may include one or more portions marked for conditional compilation based on which instruments are connected to the computer 82. For example, if a first type of DAQ instrument is connected to the computer 82, then a first portion of the program may be compiled and a second portion of the program may not be compiled. Similarly, if a second type of DAQ instrument is connected to the computer 82, then the second portion of the program may be compiled and the first portion of the program may not be compiled. For example, the conditional compilation may be based on specified conditions relating to which type of DAQ instrument is connected to the computer 82.

In another embodiment, when the graphical program is created, one or more portions of the graphical program may be disabled. The disabled portions may be prevented from being compiled and/or executed. For example, the user may desire to disable a portion of the graphical program because the portion is not completed yet or currently does not work, but the user may still desire to test other portions of the graphical program. As another example, the user may desire to disable a portion of the graphical program that is designed to control a type of instrument that is not among the instruments coupled to the computer 82.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or Micro-Channel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control. For example, the computer 82 may execute a graphical program operable to perform the automation function.

Similarly as described above, in one embodiment, when the graphical program is created, one or more portions of the graphical program may be marked for conditional compilation. In another embodiment, when the graphical program is created, one or more portions of the graphical program may be disabled.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" may include acquisition and/or processing of an image. A graphical program may be created that implements a measurement function. For example, the graphical program may be used to acquire a signal and perform the measurement function on the acquired signal.

In the embodiments of FIGS. 2A and 2B above, one or more of the various instruments may couple to the computer 82 over a network, such as the Internet. In one embodiment, the user may operate to select a target instrument or device from a plurality of possible target devices for programming or configuration. Thus the user may create or deploy a graphical program on a computer and use the graphical program in conjunction with a target device or instrument that is remotely located from the computer and coupled to the computer through a network.

Graphical software programs which perform data acquisition, analysis and/or presentation, e.g., for measurement, instrumentation control, industrial automation, or simulation, such as in the applications shown in FIGS. 2A and 2B, may be referred to as virtual instruments.

Figure 3:
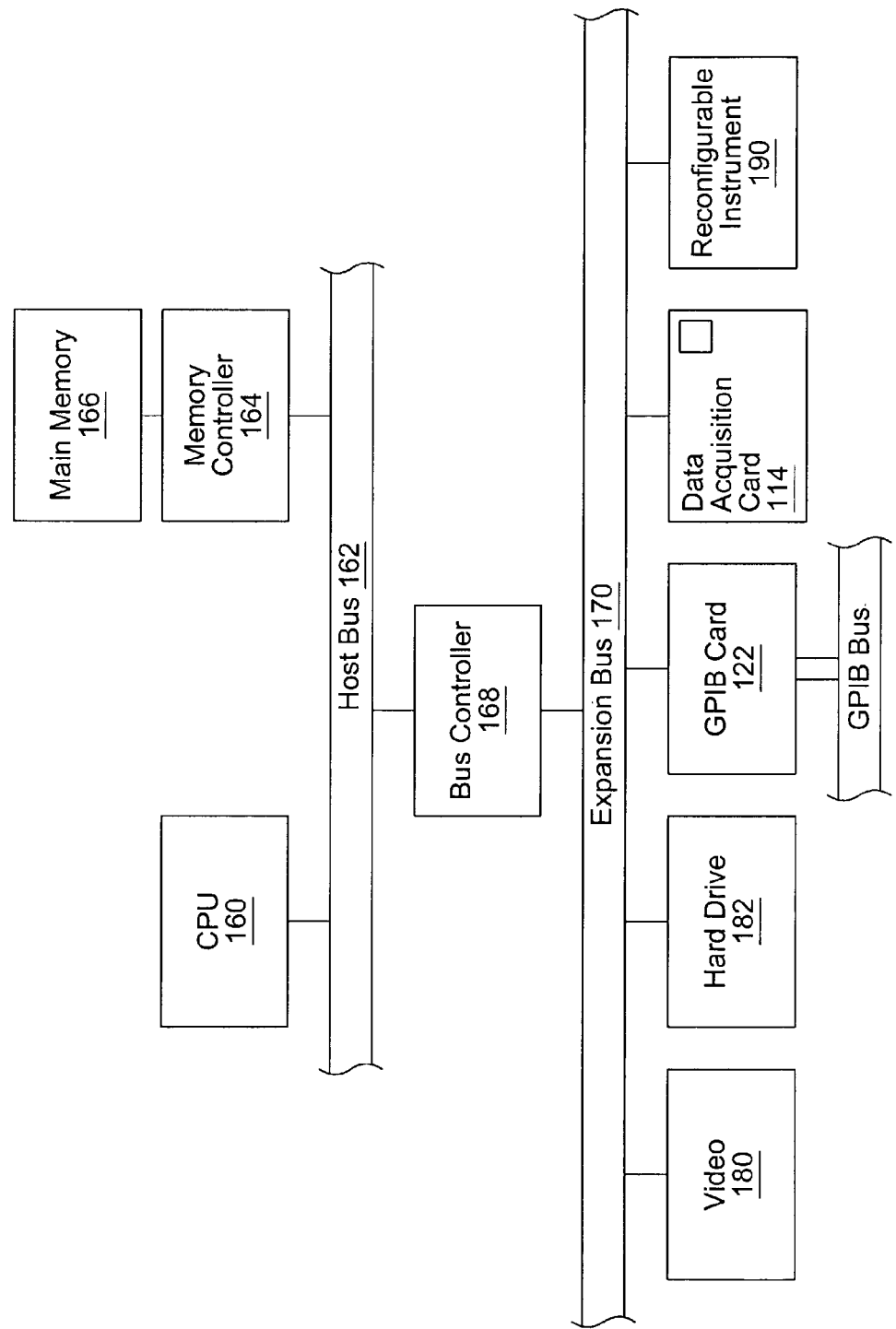
FIG. 3 is an exemplary block diagram of the computer systems of FIGS. 1, 2A and 2B.

FIG. 3—Computer System Block Diagram

FIG. 3 is a block diagram representing one embodiment of the computer system 82 illustrated in FIGS. 1, 2A, and/or 2B. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software elements such as described above with reference to FIG. 1 and may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170.

As shown, a reconfigurable instrument 190 may also be connected to the computer. The reconfigurable instrument 190 may include configurable logic, such as a programmable logic device, e.g., an FPGA, or a processor and memory, which may execute a real time operating system. According to one embodiment, a created graphical program may be deployed on the reconfigurable instrument 190. For example, a graphical programming development environment with which the graphical program is associated may provide support for configuring the reconfigurable instrument 190 to execute at least a portion of the graphical program. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 2A or 2B.

Figure 4:
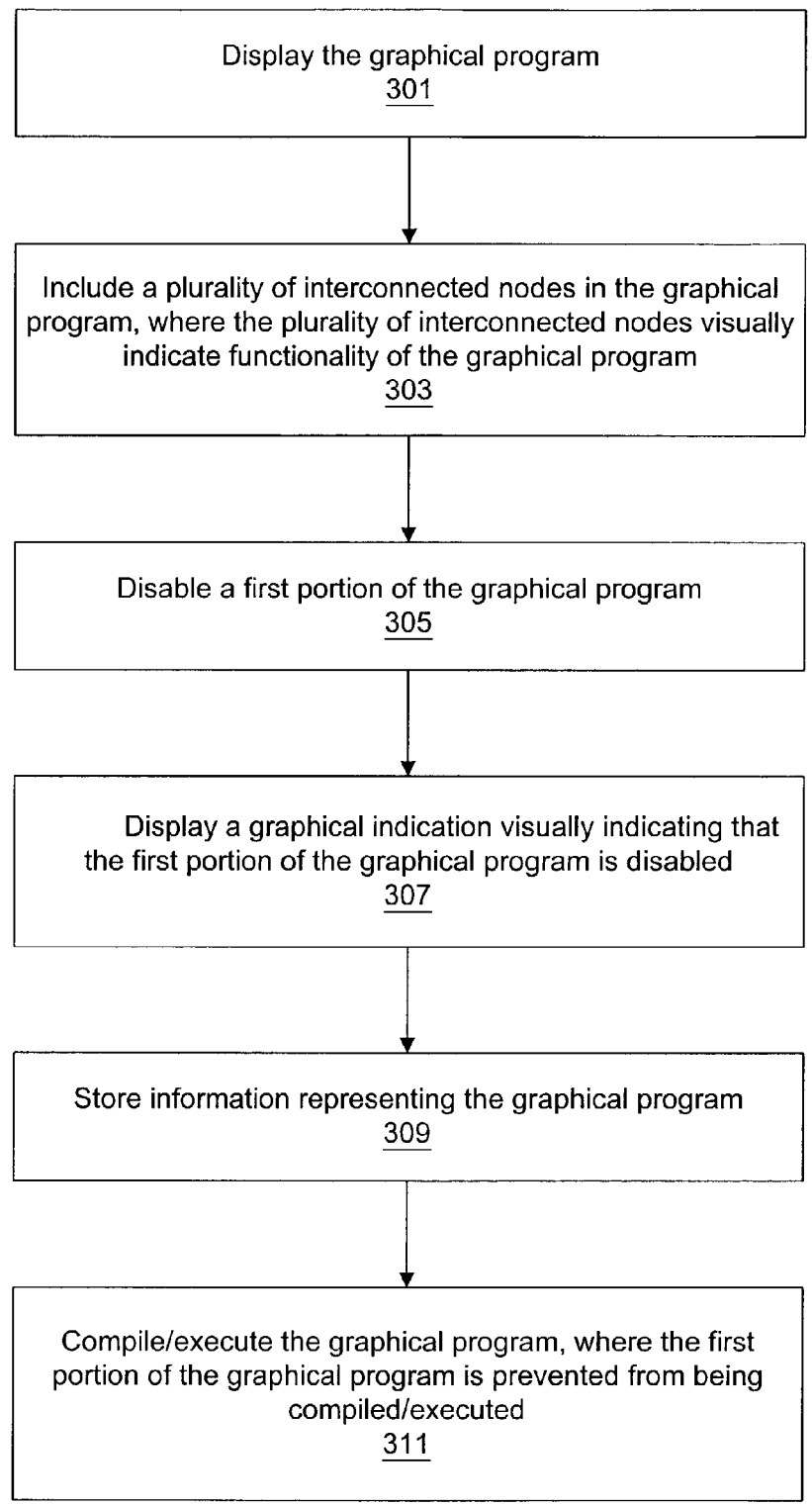
FIG. 4 is a flowchart diagram illustrating one embodiment of a method for disabling a portion of a graphical program.

FIG. 4—Disabling a Portion of a Graphical Program

FIG. 4 is a flowchart diagram illustrating one embodiment of a method for disabling a portion of a graphical program. It is noted that FIG. 4 illustrates a representative embodiment, and alternative embodiments are contemplated. Also, various elements may be combined, omitted, or performed in different orders. Also, the method of FIG. 4 may be utilized to disable a portion of any of various types of graphical programs or executable diagrams.

In one embodiment, the graphical program may be displayed, as shown in 301, e.g., may be displayed using a graphical programming development environment application. For example, when a user opens a graphical program for viewing or editing, a block diagram of the graphical program may be displayed. As another example, if the graphical program is a new graphical program that does not yet include any graphical code, a blank or empty block diagram or default block diagram for the graphical program may be displayed.

In 303, graphical code may be included in the graphical program. In one embodiment, the graphical code may include a plurality of interconnected nodes that visually indicate functionality of the graphical program. The graphical code may include any of various other types of graphical program elements as well. In another embodiment, an existing graphical program already having graphical code may be opened, and 303 may not be performed, or 303 may be performed to modify the existing graphical code or add new graphical code to the graphical program.

In one embodiment, the graphical code may be included in the graphical program in response to direct user input. For example, the graphical program may be created or assembled by the user arranging on a display a plurality of nodes or icons and then interconnecting the nodes to create the graphical program. The nodes may be interconnected in one or more of a data flow, control flow, and/or execution flow format. The plurality of interconnected nodes or icons may visually indicate functionality of the graphical program. As noted above, the graphical program may comprise a block diagram and may also include a user interface portion or front panel portion. Where the graphical program includes a user interface portion, the user may assemble the user interface on the display.

In another embodiment, the graphical code may not be included in the graphical program in response to direct user input, but may be programmatically included in the graphical program. For example, the above-incorporated patent application titled, "System and Method for Programmatically Generating a Graphical Program in Response to Program Information," describes programmatically including graphical code in a graphical program.

In 305, a first portion of the graphical program may be disabled. In various embodiments, disabling the first portion of the graphical program may include preventing the first portion of the graphical program from being compiled and/or preventing the first portion of the graphical program from being executed, as described in detail below.

In one embodiment, the first portion of the graphical program may be disabled in response to direct user input. The user may request to disable the first portion of the graphical program or may configure the first portion of the graphical program to be disabled in any of various ways. For example in one embodiment, the user may first select the first portion of the graphical program and may then request to disable the selected portion, e.g., by invoking a menu command, keyboard command, or a command based on other input. The first portion of the graphical program may be selected in any of various ways. For example, the user may drag a selection box around the first portion of the graphical program, the user may draw one or more lines separating the first portion of the graphical program from a second portion of the graphical program, the user may select nodes or other graphical program elements in the portion individually, e.g., by clicking with a mouse, etc.

In another embodiment, the graphical programming development environment may provide a specific graphical program element or object designed for disabling graphical code. Such a graphical program element or object is also referred to herein as a code disable structure. The user may configure the first portion of the graphical program to be disabled by including a code disable structure in the graphical program and associating the first portion of the graphical program with the code disable structure.

In various embodiments, the code disable structure may have any of various appearances, and the user may associate the first portion of the graphical program with the code disable structure in any of various ways. For example, in one embodiment, the code disable structure may be displayed in the graphical program as a box or other object that bounds a particular area. The user may then position nodes or other graphical program elements of the first portion of the graphical program within the code disable structure. Any graphical code displayed within the code disable structure may not be compiled and/or may not be executed, as described below. The user may position nodes or other graphical program elements within the code disable structure by moving existing nodes or elements into the code disable structure and/or by placing new nodes or elements within the code disable structure as the new nodes or elements are added to the graphical program.

In one embodiment, the user may include other kinds of information within a code disable structure in addition to graphical code. For example, the user may utilize the code disable structure to document the graphical program or include comments in the graphical program, e.g., text comments. Documentation or comments within the code disable structure may not affect execution of the graphical program.

Figure 6:
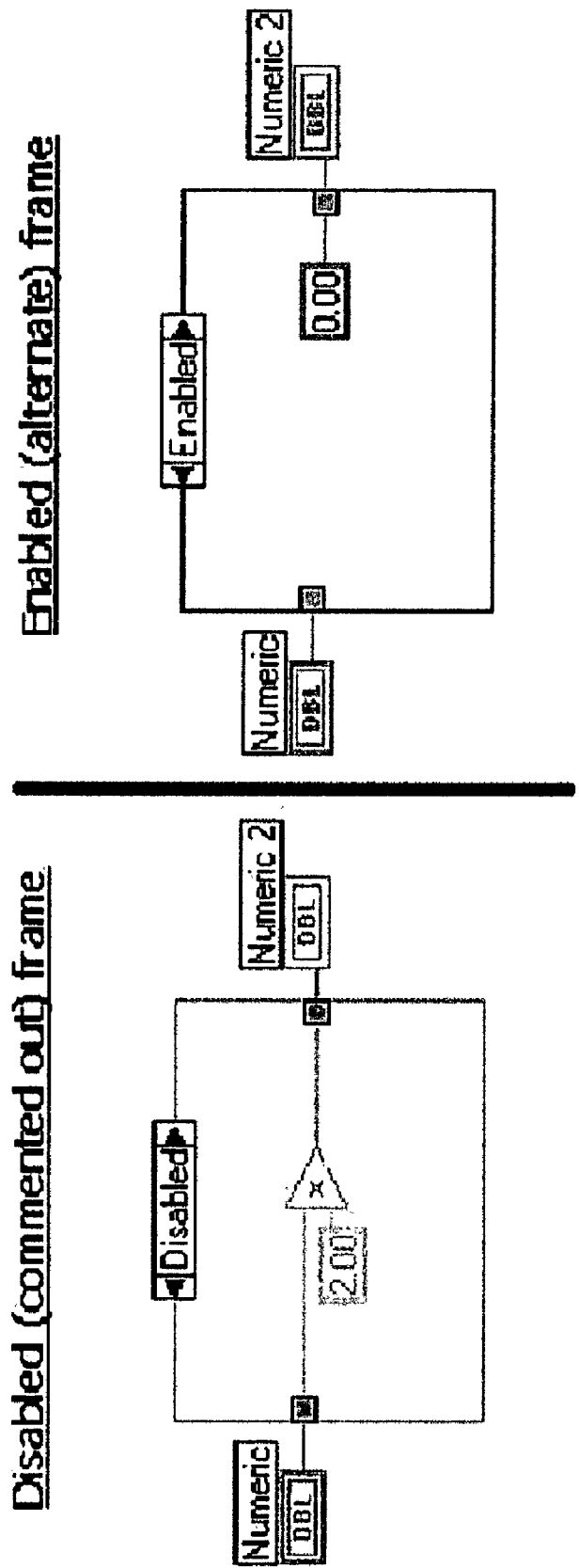
FIG. 6 illustrates an exemplary code disable structure including two frames.

In one embodiment, a code disable structure may allow the user to not only associate a disabled portion of graphical code with the code disable structure, but may also allow the user to associate one or more enabled portions of graphical code with the code disable structure. For example, one embodiment of a code disable structure may include a plurality of frames, where each frame may include enabled or disabled graphical code. For example, the user may toggle each frame from an enabled state to a disabled state, or vice versa. FIG. 6 illustrates one example of this, in which a code disable structure includes two frames. The frame on the left side displays disabled graphical code, and the frame on the right side displays enabled graphical code.

In another embodiment, the first portion of the graphical program may not be disabled in response to direct user input, but may be programmatically disabled. For example, in a case in which an application programming interface (API) is used to programmatically generate a graphical program, the graphical program may be generated so that a first portion of the graphical program is disabled. In one embodiment, the graphical programming development environment may be operable to programmatically generate graphical code associated with a node in a graphical program. The graphical programming development environment may dynamically disable or enable portions of the generated graphical code, e.g., based on user input to configure the node or based on other information within the graphical program.

In 307, a graphical indication may be displayed to visually indicate that the first portion of the graphical program is disabled, e.g., that the first portion of the graphical program is not to be compiled and/or executed. For example, displaying the graphical indication may include displaying the graphical indication within the graphical program itself. If the graphical program is currently displayed when the first portion of the graphical program is disabled in 305, e.g., if the first portion of the graphical program was disabled in response to direct user input, then the graphical indication may be immediately displayed. Otherwise, the graphical indication may be displayed when the graphical program is displayed.

In various embodiments, displaying the graphical indication may include displaying any of various types of objects or information in the graphical program, or may include altering the appearance of the graphical program or of the first portion of the graphical program in any of various ways to indicate to the user that the first portion of the graphical program is disabled. The particular technique used to display the graphical indication may depend on the particular technique used to disable the first portion of the graphical program in 305. For example, disabling the first portion of the graphical program may itself entail displaying the graphical indication. For example, as described above, in disabling the first portion of the graphical program, a user may position the first portion of the graphical program within a graphical program element such as a code disable structure. Thus, the code disable structure itself may visually indicate that any graphical code within the code disable structure is disabled. As another example, the user may draw one or more lines to separate the first portion of the graphical program from other portions of the graphical program, or such lines may be drawn automatically, e.g., in response to the user requesting the first portion of the graphical program to be disabled. Thus, these lines may visually indicate that the first portion of the graphical program is disabled. The lines may include one or more vertical lines and/or one or more horizontal lines or lines in other orientations.

In other cases, the visual appearances of disabled nodes, icons, or other elements in the first portion of the graphical program may be altered in various ways to visually indicate that they are disabled. For example, nodes or icons in the first portion of the graphical program may be dimmed, icon colors may be changed, etc.

In 309, information representing the graphical program may be stored. For example, data structures and/or files representing the graphical program may be stored. The stored information may include information specifying that the first portion of the graphical program is disabled.

In 311, the graphical program may be compiled and/or executed. For example, in one embodiment, the graphical programming development environment may be operable to compile graphical programs to produce executable code. Disabling the first portion of the graphical program may include preventing the graphical programming development environment from compiling the first portion of the graphical program when the graphical program is compiled. Thus, the first portion of the graphical program may not be executed either when the graphical program is executed.

In another embodiment, the first portion of the graphical program may still be compiled, but compiling the graphical program may generate executable code that is not executable to perform functionality of the first portion of the graphical program. In this instance, executable program instructions corresponding to the first portion of the graphical program may be generated when the executable code for the graphical program is generated, but the executable code for the graphical program may be structured or altered in such a way that the program instructions corresponding to the first portion of the graphical program will never actually execute during execution of the graphical program.

It may be advantageous to not compile the first portion of the graphical program or to not include executable program instructions corresponding to the first portion of the graphical program in the executable code generated for the graphical program. For example, this may reduce the size of the generated executable code, which may be advantageous for some applications.

In another embodiment, the graphical program may be executed without compiling the graphical program. For example, the graphical programming development environment may be operable to interpret the graphical program for execution. In this case, the graphical program may be executed in such a way that the first portion of the graphical program does not execute during execution of the graphical program.

In one embodiment, the first portion of the graphical program may include invalid graphical code, but the user may not be informed that the graphical code is invalid when the graphical program is compiled/executed. Thus, the user may simply ignore the first portion of the graphical program, since it does not affect the compilation/execution of the graphical program. In another embodiment, if the first portion of the graphical program includes invalid graphical code, information indicating the errors may still be displayed.

In one embodiment, the graphical programming development environment may propagate type information through the graphical program as the graphical program is being edited. If the disabled first portion of the graphical program receives input from other portions of the graphical program, type information may still be propagated into the first portion of the graphical program in one embodiment. Similarly, if output of the first portion of the graphical program is used by other portions of the graphical program, type information may be propagated out of the first portion of the graphical program.

It is noted that although a single disabled portion of the graphical program is discussed above, any number of portions within the graphical program may be disabled using techniques such as described above.

Figure 5:
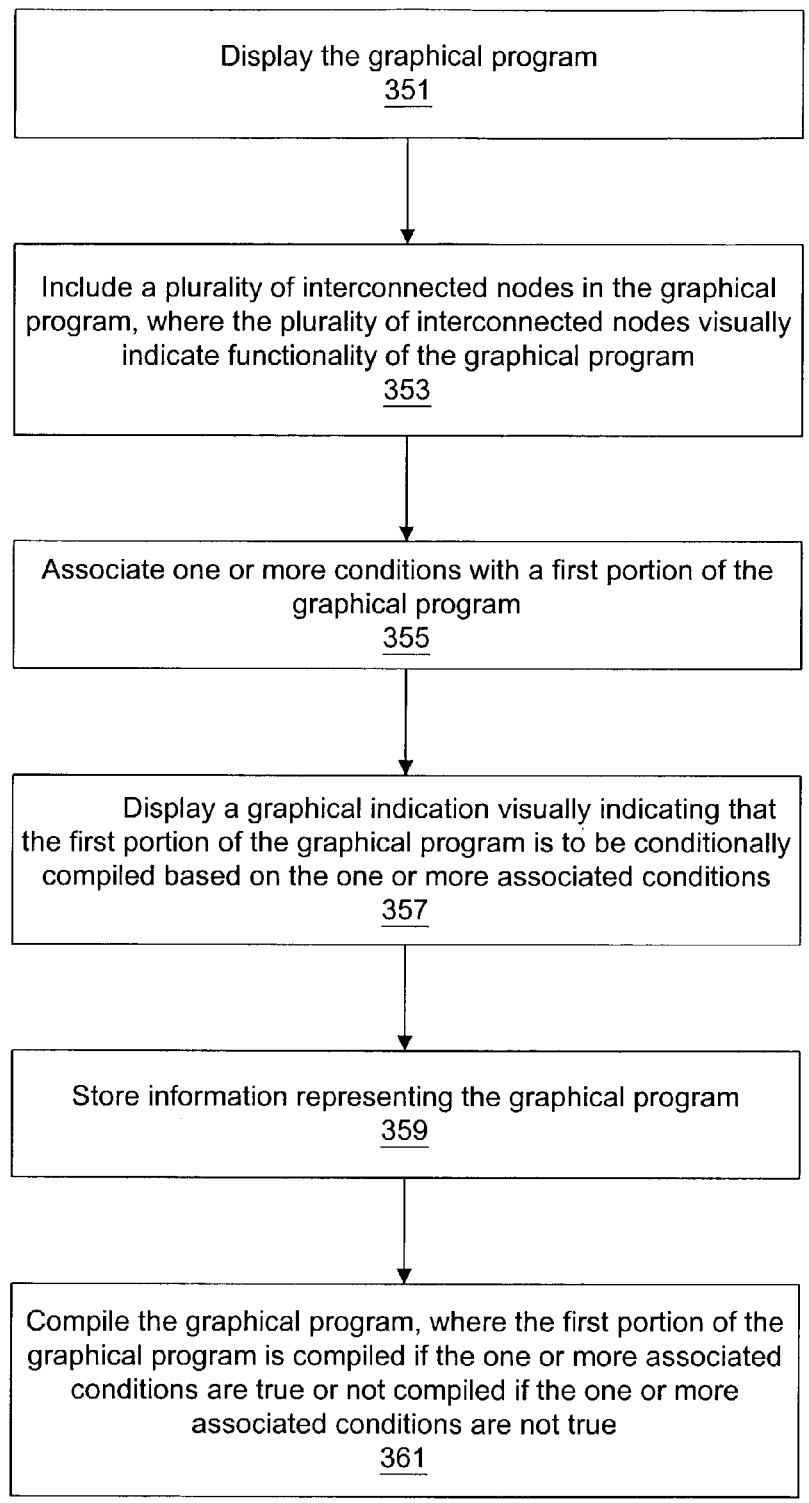
FIG. 5 is a flowchart diagram illustrating one embodiment of a method for conditionally compiling graphical code in a graphical program.

FIG. 5—Conditionally Compiling Graphical Code in a Graphical Program

FIG. 5 is a flowchart diagram illustrating one embodiment of a method for conditionally compiling graphical code in a graphical program. It is noted that FIG. 5 illustrates a representative embodiment, and alternative embodiments are contemplated. Also, various elements may be combined, omitted, or performed in different orders.

In one embodiment, the graphical program may be displayed, as shown in 351. In 353, graphical code may be included in the graphical program. In one embodiment, the graphical code may include a plurality of interconnected nodes that visually indicate functionality of the graphical program. Elements 351 and 353 may be performed similarly as described above with reference to elements 301 and 303 of FIG. 4.

In 355, one or more conditions may be associated with a first portion of the graphical program. In various embodiments, the first portion of the graphical program may be specified or selected in any of various ways, e.g., using techniques similar to those described above with reference to FIG. 4. Also, in various embodiments, the one or more conditions may be specified in any of various ways and may be associated with the first portion of the graphical program in any of various ways. In one embodiment, the one or more conditions may include one or more Boolean expressions. The Boolean expressions may be based on any of various values or operators. In one embodiment, a Boolean expression may be based on one or more variables. For example, an expression may evaluate to True if a particular variable is defined or evaluate to False otherwise, or vice versa. Similarly, an expression may evaluate to True if a variable is set to a particular value or may evaluate to False otherwise. The graphical programming development environment may enable the user to provide text or other input to specify the one or more conditions to associate with the first portion of the graphical program.

In 357, a graphical indication visually indicating that the first portion of the graphical program is to be conditionally compiled based on the one or more associated conditions may be displayed. In various embodiments, the graphical indication may be displayed in any of various ways, e.g., using techniques similar to those described above with reference to FIG. 4. In one embodiment, the conditions associated with the first portion of the graphical program may be displayed together with the first portion of the graphical program.

In one embodiment, the graphical programming development environment may provide a specific graphical program element or object designed for conditionally compiling graphical code. Such a graphical program element or object is also referred to herein as a conditional compilation structure. The user may configure the first portion of the graphical program to be conditionally compiled by including a conditional compilation structure in the graphical program and associating the first portion of the graphical program with the conditional compilation structure.

In various embodiments, the conditional compilation structure may have any of various appearances, and the user may associate the first portion of the graphical program with the conditional compilation structure in any of various ways. For example, in one embodiment, the conditional compilation structure may be displayed in the graphical program as a box or other object that bounds a particular area. The user may then position nodes or other graphical program elements of the first portion of the graphical program within the conditional compilation structure. The conditional compilation structure may allow the user to view and specify the one or more conditions to associate with the first portion of the graphical program. Any graphical code displayed within the conditional compilation structure may be conditionally compiled, based on the one or more conditions. The user may position nodes or other graphical program elements within the conditional compilation structure by moving existing nodes or elements into the conditional compilation structure and/or by placing new nodes or elements within the conditional compilation structure as the new nodes or elements are added to the graphical program.

In one embodiment, the conditional compilation structure may allow more than one portion of the graphical program to be conditionally compiled. For example, the conditional compilation structure may include a plurality of frames, where each frame may include a portion of graphical code and an associated set of one or more conditions. The user may be able to configure the number of frames in the conditional compilation structure. The frames may be displayed simultaneously within the graphical program, or only one frame may be visible at a time, and the user may select which frame(s) to view.

In 359, information representing the graphical program may be stored. For example, data structures and/or files representing the graphical program may be stored. The stored information may include information specifying that the first portion of the graphical program is to be conditionally compiled, as well information specifying the associated conditions.

In 361, the graphical program may be compiled. Compiling the graphical program may include determining whether the one or more conditions associated with the first portion of the graphical program are true. For example, where the one or more conditions are specified as Boolean expressions, the Boolean expressions may be evaluated. The first portion of the graphical program may be compiled if the one or more associated conditions are true. Otherwise, the first portion of the graphical program may not be compiled.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for selectively compiling a graphical program, the method comprising:
    displaying the graphical program on a display, wherein the graphical program comprises a plurality of interconnected nodes that visually indicate functionality of the graphical program, wherein the functionality includes first functionality implemented by a first portion of the graphical program comprising a first subset of the plurality of interconnected nodes;
    displaying a graphical indication in the graphical program, wherein the graphical indication visually indicates that the first portion of the graphical program, is to be prevented from being compiled and that the first functionality is to be prevented from being performed during execution of the graphical program; and
    compiling the graphical program, wherein the first portion, of the graphical program is prevented from being compiled
    whenever preventing the first portionof the graphical program from being compiled prevents the first functionality from being performed during execution of the graphical program.

2. The method of claim 1,
    wherein the graphical indication visually indicates that a second portion of the graphical program is to be compiled;
    wherein said compiling the graphical program includes compiling the second portion of the graphical program.

3. The method of claim 1,
    wherein said compiling the graphical program comprises generating executable program instructions for executing the graphical program;
    wherein the generated executable program instructions do not include program instructions for executing the first portion of the graphical program.

4. The method of claim 1,
    wherein said displaying the graphical indication on the display comprises displaying the graphical indication in response to user input.

5. The method of claim 1, wherein said displaying the graphical indication on the display comprises:
    displaying an object on a first portion of the display; and
    displaying one or more nodes of the graphical program within the object;
    wherein the object indicates that the one or more nodes within the object are not to be compiled.

6. The method of claim 5, further comprising:
    receiving user input to position the one or more nodes within the object.

7. The method of claim 1, wherein said displaying the graphical indication on the display comprises:

displaying a first node on the display; and
associating one or more nodes of the graphical program with the first node;
wherein the first node indicates that the one or more nodes associated with the first node are not to be compiled.

8. The method of claim 1,
wherein said displaying the graphical indication on the display comprises displaying one or more lines visually separating the first portion of the graphical program from a second portion of the graphical program;
wherein the one or more lines visually indicate that the first portion of the graphical program is not to be compiled.

9. The method of claim 8,
wherein the one or more lines comprise one or more vertical lines.

10. The method of claim 8,
wherein the one or more lines comprise one or more horizontal lines.

11. The method of claim 1, further comprising:
wherein the first portion of the graphical program includes one or more nodes;
wherein said displaying the graphical indication comprises altering an appearance of the one or more nodes in the first portion of the graphical program.

12. The method of claim 1, further comprising:
selecting the first portion of the graphical program.

13. The method of claim 1, further comprising:
executing the graphical program;
wherein said executing does not include executing the first portion of the graphical program.

14. The method of claim 1, further comprising:
executing the graphical program;
wherein the graphical program is not executable to perform the first portion of the graphical program.

15. The method of claim 1,
wherein the first portion of the graphical program includes invalid graphical code;
wherein the invalid graphical code does not result in an error when performing said compiling the graphical program.

16. The method of claim 1,
wherein the graphical program comprises a block diagram portion and a user interface portion.

17. The method of claim 1,
wherein the plurality of interconnected nodes indicate one or more of data flow, control flow, and/or execution flow.

18. A computer-implemented method for conditionally compiling a graphical program, the method comprising:
displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
displaying a graphical indication in the graphical program, wherein the graphical indication visually indicates that the first portion of the graphical program is to be conditionally compiled based on one or more conditions and that the second portion of the graphical program is to be unconditionally compiled;
compiling the graphical program;
wherein said compiling the graphical program includes; determining whether the one or more conditions are true;
compiling the first portion, of the graphical program if the one or more conditions are true;
not compiling the first portion of the graphical program if the one or more conditions are not true; and
compiling the second portion of the graphical program regardless of whether or not the one or more conditions are true; and
executing the graphical program;
wherein the graphical program is not executable to perform the first portion of the graphical program if the one or more conditions are not true.

19. The method of claim 18, further comprising:
receiving user input specifying the one or more conditions.

20. The method of claim 18,
wherein the one or more conditions includes a first condition based on a variable;
wherein determining whether the first condition is true comprises determining whether the variable has a particular value.

21. The method of claim 18,
wherein the one or more conditions includes a first condition based on a variable;
wherein determining whether the first condition is true comprises determining whether the variable is defined.

22. The method of claim 18,
wherein the graphical indication also visually indicates the one or more conditions on which the conditional compilation of the first portion of the graphical program is based.

23. The method of claim 18,
wherein said compiling the graphical program comprises generating executable program instructions for executing the graphical program;
wherein the generated executable program instructions include program instructions for executing the first portion of the graphical program only if the one or more conditions are true.

24. The method of claim 18,
wherein said displaying the graphical indication on the display comprises displaying the graphical indication in response to user input.

25. The method of claim 18, wherein said displaying the graphical indication on the display comprises:
displaying an object on a first portion of the display; and
displaying one or more nodes of the graphical program within the object;
wherein the object indicates that the one or more nodes within the object are to be conditionally compiled.

26. The method of claim 25, further comprising:
receiving user input to position the one or more nodes within the object.

27. The method of claim 18, wherein said displaying the graphical indication on the display comprises:
displaying a first node on the display; and
associating one or more nodes of the graphical program with the first node;
wherein the first node indicates that the one or more nodes associated with the first node are to be conditionally compiled.

28. The method of claim 18,
wherein said displaying the graphical indication on the display comprises displaying one or more lines visually separating the first portion of the graphical program from a second portion of the graphical program;
wherein the one or more lines visually indicate that the first portion of the graphical program is to be conditionally compiled.

29. The method of claim 28,
wherein the one or more lines comprise one or more vertical lines.

30. The method of claim 28,
wherein the one or more lines comprise one or more horizontal lines.

31. The method of claim 18, further comprising:
wherein the first portion of the graphical program includes one or more nodes;
wherein said displaying the graphical indication comprises altering an appearance of the one or more nodes in the first portion of the graphical program.

32. The method of claim 18, further comprising:
selecting the first portion of the graphical program.

33. The method of claim 18, further comprising:
executing the graphical program;
wherein said executing includes executing the first portion of the graphical program only if the one or more conditions are true.

34. The method of claim 18,
wherein the graphical program comprises a block diagram portion and a user interface portion.

35. The method of claim 18,
wherein the plurality of interconnected nodes indicate one or more of data flow, control flow, and/or execution flow.

36. A computer-implemented method comprising:
including a plurality of interconnected nodes in the executable graphical program, wherein the plurality of interconnected nodes indicate one or more of data flow, control flow, and/or execution flow;
prior to execution of the graphical program,
including a code disable structure in the graphical program;
displaying the code disable structure, wherein the code disable structure is displayed in a first area;
associating one or more nodes with the code disable structure to disable the one or more nodes in the graphical program, wherein disabled the one or more nodes prevents functionality implemented by the one or more nodes from being performed during execution of the graphical program, wherein said associating the one or more nodes with the code disable structure comprises positioning the one or more nodes within the first area in response to user input;
storing information representing the graphical program; and
executing the graphical program, wherein the functionality implemented by the one or more nodes is not performed during execution of the graphical program.

37. The method of claim 36,
wherein said associating the one or more nodes comprises associating the one or more nodes in response to user input.

38. The method of claim 37,
wherein said associating the one or more nodes in response to user input comprises associating the one or more nodes in response to user input indicating a desire to disable the one or more nodes.

39. The method of claim 36, further comprising:
displaying the graphical program; and
visually indicating that the one or more nodes are disabled.

40. The method of claim 36, further comprising:
compiling the graphical program, wherein said compiling comprises generating executable program instructions operable to perform functionality of nodes in the graphical program that are not disabled, but not generating executable program instructions operable to perform functionality of nodes in the graphical program that are disabled.

41. The method of claim 36, further comprising:
compiling the graphical program, wherein said compiling comprises generating executable program instructions operable to perform functionality of nodes in the graphical program that are not disabled without performing functionality of nodes in the graphical program that are disabled.

42. The method of claim 36,
wherein said disabling the one or more nodes in the graphical program comprises programmatically disabling the one or more nodes.

43. The method of claim 36, further comprising:
including a first graphical program elements in the graphical program;
wherein said associating the one or more of the nodes comprises associating the one or more nodes with the first graphical program element.

44. The method of claim 36, further comprising:
wherein said associating the one or more of the nodes comprises associating the one or more nodes in response to user input indicating a desire to disable the selected one or more nodes.

45. The method of claim 36,
wherein the graphical program is not executable to perform functionality associated with the one or more nodes.

46. The method of claim 36,
wherein said including the plurality of interconnected nodes in the graphical program comprises:
arranging a plurality of nodes on a display; and
interconnecting the plurality of nodes in response to user input.

47. The method of claim 36,
wherein the graphical program comprises a block diagram portion and a user interface portion.

48. The method of claim 36,
wherein the one or more nodes have functionality including one or more of:
industrial automation functionality;
process control functionality; and/or
test and measurement functionality;
wherein said disabling the one or more of the nodes comprises preventing the functionality of the one or more nodes from being performed during execution of the graphical program.

49. The method of claim 36,
wherein said storing information representing the graphical program comprises storing information indicating that the one or more nodes are disabled.

50. A computer-implemented method for conditionally compiling a graphical program, the method comprising:
displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
displaying a graphical indication in the graphical program, wherein the graphical indication visually indicates that the first portion of the graphical program is to be conditionally compiled based on one or more conditions and that the second portion of the graphical program is to be unconditionally compiled; and compiling the graphical program;
wherein said compiling the graphical program includes:
  determining whether the one or more conditions are true;
  compiling the first portion of the graphical program if the one or more conditions are true;
  not compiling the first portion of the graphical program if the one or more conditions are not true; and
  compiling the second portion of the graphical program regardless of whether or not the one or more conditions are true;
wherein the one or more conditions includes a first condition based on a variable;
wherein determining whether the first condition is true comprises determining whether the variable is defined.

51. A computer-implemented method for conditionally compiling a graphical program, the method comprising:
  displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
  displaying a graphical indication in the graphical program, wherein the graphical indication visually indicates that the first portion of the graphical program is to be conditionally compiled based on one or more conditions and that the second portion of the graphical program is to be unconditionally compiled; wherein the graphical indication also visually indicates the one or more conditions on which the conditional compilation of the first portion of the graphical program is based; and
  compiling the graphical program;
  wherein said compiling the graphical program includes:
    determining whether the one or more conditions are true;
    compiling the first portion of the graphical program if the one or more conditions are true;
    not compiling the first portion of the graphical program if the one or more conditions are not true; and
    compiling the second portion of the graphical program regardless of whether or not the one or more conditions are true.

52. A computer-implemented method for conditionally compiling a graphical program, the method comprising:
  displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
  displaying a graphical indication in the graphical program, wherein the graphical indication visually indicates that the first portion of the graphical program is to be conditionally compiled based on one or more conditions and that the second portion of the graphical program is to be unconditionally compiled;
  wherein said displaying the graphical indication on the display comprises displaying one or more vertical lines visually separating the first portion of the graphical program from a second portion of the graphical program;
  wherein the one or more vertical lines visually indicate that the first portion of the graphical program is to be conditionally compiled; and
  compiling the graphical program;
  wherein said compiling the graphical program includes:
    determining whether the one or more conditions are true;
    compiling the first portion of the graphical program if the one or more conditions are true;
    not compiling the first portion of the graphical program if the one or more conditions are not true; and
    compiling the second portion of the graphical program regardless of whether or not the one or more conditions are true.

53. A computer-implemented method for conditionally compiling a graphical program, the method comprising:
  displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
  displaying a graphical indication in the graphical program, wherein the graphical indication visually indicates that the first portion of the graphical program is to be conditionally compiled based on one or more conditions and that the second portion of the graphical program is to be unconditionally compiled;
  wherein said displaying the graphical indication on the display comprises displaying one or more horizontal lines visually separating the first portion of the graphical program from a second portion of the graphical program;
  wherein the one or more horizontal lines visually indicate that the first portion of the graphical program is to be conditionally compiled; and
  compiling the graphical program;
  wherein said compiling the graphical program includes:
    determining whether the one or more conditions are true;
    compiling the first portion of the graphical program if the one or more conditions are true;
    not compiling the first portion of the graphical program if the one or more conditions are not true; and
    compiling the second portion of the graphical program regardless of whether or not the one or more conditions are true.

54. A computer-implemented method for conditionally compiling a graphical program, the method comprising:
  displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
  displaying a graphical indication in the graphical program, wherein the graphical indication visually indicates that the first portion of the graphical program is to be conditionally compiled based on one or more conditions and that the second portion of the graphical program is to be unconditionally compiled;
  wherein the first portion of the graphical program includes one or more nodes;

wherein said displaying the graphical indication comprises altering an appearance of the one or more nodes in the first portion of the graphical program; and compiling the graphical program;

wherein said compiling the graphical program includes:
  determining whether the one or more conditions are true;
  compiling the first portion of the graphical program if the one or more conditions are true;
  not compiling the first portion of the graphical program if the one or more conditions are not true; and
  compiling the second portion of the graphical program regardless of whether or not the one or more conditions are true.

55. A computer-implemented method for conditionally compiling a graphical program, the method comprising:

displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;

displaying a graphical indication in the graphical program, wherein the graphical indication visually indicates that the first portion of the graphical program is to be conditionally compiled based on one or more conditions and that the second portion of the graphical program is to be unconditionally compiled; and compiling the graphical program;

wherein said compiling the graphical program includes:
  determining whether the one or more conditions are true;
  compiling the first portion of the graphical program if the one or more conditions are true;
  not compiling the first portion of the graphical program if the one or more conditions are not true; and
  compiling the second portion of the graphical program regardless of whether or not the one or more conditions are true; and executing the graphical program;

wherein said executing includes executing the first portion of the graphical program only if the one or more conditions are true.

56. A computer readable memory medium comprising program instructions for selectively compiling a graphical program, wherein the program instructions are executable to:

display the graphical program on a display, wherein the graphical program comprises a plurality of interconnected nodes that visually indicate functionality of the graphical program, wherein the functionality includes first functionality implemented by a first portion of the graphical program comprising a first subset of the plurality of interconnected nodes;

display a graphical indication in the graphical program, wherein the graphical indication visually indicates that the first portion of the graphical program is to be prevented from being compiled and that the first functionality is to be prevented from being performed during execution of the graphical program; and compile the graphical program, wherein the first portion of the graphical program is prevented from being compiled;

wherein preventing the first portion of the graphical program from being compiled prevents the first functionality from being performed during execution of the graphical program.

57. The computer readable memory medium of claim 56, wherein the graphical indication visually indicates that a second portion of the graphical program is to be compiled;

wherein said compiling the graphical program includes compiling the second portion of the graphical program.

58. The computer readable memory medium of claim 56, wherein said compiling the graphical program comprises generating executable program instructions for executing the graphical program;

wherein the generated executable program instructions do not include program instructions for executing the first portion of the graphical program.

59. The computer readable memory medium of claim 56, wherein said displaying the graphical indication on the display comprises displaying the graphical indication in response to user input.

60. The computer readable memory medium of claim 56, wherein said displaying the graphical indication on the display comprises:

displaying an object on a first portion of the display; and
displaying one or more nodes of the graphical program within the object;
wherein the object indicates that the one or more nodes within the object are not to be compiled.

61. The computer readable memory medium of claim 60, wherein the program instructions are further executable to:
receive user input to position the one or more nodes within the object.

62. The computer readable memory medium of claim 56, wherein said displaying the graphical indication on the display comprises:

displaying a first node on the display; and
associating one or more nodes of the graphical program with the first node;
wherein the first node indicates that the one or more nodes associated with the first node are not to be compiled.

63. The computer readable memory medium of claim 56, wherein said displaying the graphical indication on the display comprises displaying one or more lines visually separating the first portion of the graphical program from a second portion of the graphical program;
wherein the one or more lines visually indicate that the first portion of the graphical program is not to be compiled.

64. The computer readable memory medium of claim 63, wherein the one or more lines comprise one or more vertical lines.

65. The computer readable memory medium of claim 63, wherein the one or more lines comprise one or more horizontal lines.

66. The computer readable memory medium of claim 56, wherein the first portion of the graphical program includes one or more nodes;
wherein said displaying the graphical indication comprises altering an appearance of the one or more nodes in the first portion of the graphical program.

67. The computer readable memory medium of claim 56, wherein the program instructions are further executable to:
select the first portion of the graphical program.

68. The computer readable memory medium of claim 56, wherein the program instructions are farther executable to:
execute the graphical program;

wherein said executing does not include executing the first portion of the graphical program.

69. The computer readable memory medium of claim 56, wherein the program instructions are farther executable to:
execute the graphical program;
wherein the graphical program is not executable to perform the first portion of the graphical program.

70. The computer readable memory medium of claim 56, wherein the first portion of the graphical program includes invalid graphical code;
wherein the invalid graphical code does not result in an error when performing said compiling the graphical program.

71. The computer readable memory medium of claim 56, wherein the graphical program comprises a block diagram portion and a user interface portion.

72. The computer readable memory medium of claim 56, wherein the plurality of interconnected nodes indicate one or more of data flow, control flow, and/or execution flow.

73. A computer readable memory medium comprising program instructions for conditionally compiling a graphical program, wherein the program instructions are executable to:
display the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
display a graphical indication in the graphical program, wherein the graphical indication visually indicates that the first portion of the graphical program is to be conditionally compiled based on one or more conditions and that the second portion of the graphical program is to be unconditionally compiled;
compile the graphical program;
wherein, in compilation of the graphical program, the program instructions are further executable to:
determine whether the one or more conditions are true;
compile the first portion of the graphical program if the one or more conditions are true;
not compile the first portion of the graphical program if the one or more conditions are not true; and
compile the second portion of the graphical program regardless of whether or not the one or more conditions are true; and
execute the graphical program;
wherein the graphical program is executable to perform the first portion of the graphical program only if the one or more conditions are true.

74. The computer readable memory medium of claim 73, wherein the program instructions are further executable to:
receive user input specifying the one or more conditions.

75. The computer readable memory medium of claim 73, wherein the one or more conditions includes a first condition based on a variable;
wherein determining whether the first condition is true comprises determining whether the variable has a particular value.

76. The computer readable memory medium of claim 73, wherein the one or more conditions includes a first condition based on a variable;
wherein determining whether the first condition is true comprises determining whether the variable is defined.

77. The computer readable memory medium of claim 73, wherein the graphical indication also visually indicates the one or more conditions on which the conditional compilation of the first portion of the graphical program is based.

78. The computer readable memory medium of claim 73, wherein compilation of the graphical program comprises generating executable program instructions for executing the graphical program;
wherein the generated executable program instructions include first program instructions for executing the first portion of the graphical program only if the one or more conditions are true.

79. The computer readable memory medium of claim 73, wherein said displaying the graphical indication on the display comprises displaying the graphical indication in response to user input.

80. The computer readable memory medium of claim 73, wherein in displaying the graphical indication on the display, the program instructions are further executable to:
display an object on a first portion of the display; and
display one or more nodes of the graphical program within the object;
wherein the object indicates that the one or more nodes within the object are to be conditionally compiled.

81. The computer readable memory medium of claim 80, wherein the program instructions are further executable to:
receive user input to position the one or more nodes within the object.

82. The computer readable memory medium of claim 73, wherein in displaying the graphical indication on the display, the program instructions are further executable to:
display a first node on the display; and
associate one or more nodes of the graphical program with the first node;
wherein the first node indicates that the one or more nodes associated with the first node are to be conditionally compiled.

83. The computer readable memory medium of claim 73, wherein said displaying the graphical indication on the display comprises displaying one or more lines visually separating the first portion of the graphical program from a second portion of the graphical program;
wherein the one or more lines visually indicate that the first portion of the graphical program is to be conditionally compiled.

84. The computer readable memory medium of claim 83, wherein the one or more lines comprise one or more vertical lines.

85. The computer readable memory medium of claim 83, wherein the one or more lines comprise one or more horizontal lines.

86. The computer readable memory medium of claim 73, wherein the first portion of the graphical program includes one or more nodes;
wherein said displaying the graphical indication comprises altering an appearance of the one or more nodes in the first portion of the graphical program.

87. The computer readable memory medium of claim 73, wherein the program instructions are further executable to:
select the first portion of the graphical program.

88. The computer readable memory medium of claim 73, wherein the program instructions are further executable to:
execute the graphical program;
wherein the graphical program is not executable to perform the first portion of the graphical program if the one or more conditions are not true.

89. The computer readable memory medium of claim 73, wherein the graphical program comprises a block diagram portion and a user interface portion.

90. The computer readable memory medium of claim 73, wherein the plurality of interconnected nodes indicate one or more of data flow, control flow, and/or execution flow.

91. A computer readable memory medium for conditionally compiling a graphical program, wherein the program instructions are executable to implement:
displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
displaying a graphical indication in the graphical program, wherein the graphical indication visually indicates that the first portion of the graphical program is to be conditionally compiled based on one or more conditions and that the second portion of the graphical program is to be unconditionally compiled; and
compiling the graphical program;
wherein said compiling the graphical program includes:
determining whether the one or more conditions are true;
compiling the first portion of the graphical program if the one or more conditions are true;
not compiling the first portion of the graphical program if the one or more conditions are not true; and
compiling the second portion of the graphical program regardless of whether or not the one or more conditions are true;
wherein the one or more conditions includes a first condition based on a variable;
wherein determining whether the first condition is true comprises determining whether the variable is defined.

92. A computer readable memory medium for conditionally compiling a graphical program, wherein the program instructions are executable to implement:
displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
displaying a graphical indication in the graphical program, wherein the graphical indication visually indicates that the first portion of the graphical program is to be conditionally compiled based on one or more conditions and that the second portion of the graphical program is to be unconditionally compiled, wherein the graphical indication also visually indicates the one or more conditions on which the conditional compilation of the first portion of the graphical program is based; and
compiling the graphical program;
wherein said compiling the graphical program includes:
determining whether the one or more conditions are true;
compiling the first portion of the graphical program if the one or more conditions are true;
not compiling the first portion of the graphical program if the one or more conditions are not true; and
compiling the second portion of the graphical program regardless of whether or not the one or more conditions are true.

93. A computer readable memory medium for conditionally compiling a graphical program, wherein the program instructions are executable to implement:
displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
displaying a graphical indication in the graphical program, wherein the graphical indication visually indicates that the first portion of the graphical program is to be conditionally compiled based on one or more conditions and that the second portion of the graphical program is to be unconditionally compiled;
wherein said displaying the graphical indication on the display comprises displaying one or more vertical lines visually separating the first portion of the graphical program from a second portion of the graphical program;
wherein the one or more vertical lines visually indicate that the first portion of the graphical program is to be conditionally compiled; and
compiling the graphical program;
wherein said compiling the graphical program includes:
determining whether the one or more conditions are true;
compiling the first portion of the graphical program if the one or more conditions are true;
not compiling the first portion of the graphical program if the one or more conditions are not true; and
compiling the second portion of the graphical program regardless of whether or not the one or more conditions are true.

94. A computer readable memory medium for conditionally compiling a graphical program, wherein the program instructions are executable to implement:
displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;
displaying a graphical indication in the graphical program, wherein the graphical indication visually indicates that the first portion of the graphical program is to be conditionally compiled based on one or more conditions and that the second portion of the graphical program is to be unconditionally compiled;
wherein said displaying the graphical indication on the display comprises displaying one or more horizontal lines visually separating the first portion of the graphical program from a second portion of the graphical program;
wherein the one or more horizontal lines visually indicate that the first portion of the graphical program is to be conditionally compiled; and
compiling the graphical program;
wherein said compiling the graphical program includes:
determining whether the one or more conditions are true;

compiling the first portion of the graphical program if the one or more conditions are true;

not compiling the first portion of the graphical program if the one or more conditions are not true; and compiling the second portion of the graphical program regardless of whether or not the one or more conditions are true.

95. A computer readable memory medium for conditionally compiling a graphical program, wherein the program instructions are executable to implement:

displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;

displaying a graphical indication in the graphical program, wherein the graphical indication visually indicates that the first portion of the graphical program is to be conditionally compiled based on one or more conditions and that the second portion of the graphical program is to be unconditionally compiled;

wherein the first portion of the graphical program includes one or more nodes;

wherein said displaying the graphical indication comprises altering an appearance of the one or more nodes in the first portion of the graphical program; and compiling the graphical program;

wherein said compiling the graphical program includes:

determining whether the one or more conditions are true;

compiling the first portion of the graphical program if the one or more conditions are true;

not compiling the first portion of the graphical program if the one or more conditions are not true; and compiling the second portion of the graphical program regardless of whether or not the one or more conditions are true.

96. A computer readable memory medium for conditionally compiling a graphical program, wherein the program instructions are executable to implement:

displaying the graphical program on a display, wherein the graphical program comprises a plurality of interconnected nodes that visually indicate functionality of the graphical program, wherein the graphical program includes a first portion comprising a first subset of the plurality of interconnected nodes and a second portion comprising a second subset of the plurality of interconnected nodes;

displaying a graphical indication in the graphical program, wherein the graphical indication visually indicates that the first portion of the graphical program is to be conditionally compiled based on one or more conditions and that the second portion of the graphical program is to be unconditionally compiled;

compiling the graphical program;

wherein said compiling the graphical program includes:

determining whether the one or more conditions are true;

compiling the first portion of the graphical program if the one or more conditions are true;

not compiling the first portion of the graphical program if the one or more conditions are not true; and compiling the second portion of the graphical program regardless of whether or not the one or more conditions are true; and executing the graphical program;

wherein the graphical program is not executable to perform the first portion of the graphical program if the one or more conditions are not true.

97. A computer readable memory medium comprising program instructions, wherein the program instructions are executable to:

include a plurality of interconnected nodes in an executable graphical program, wherein the plurality of interconnected nodes indicate one or more of data flow, control flow, and/or execution flow;

prior to execution of the graphical program, include a code disable structure in the graphical program;

display the code disable structure, wherein the code disable structure is displayed in a first area;

associate one or more nodes with the code disable structure to disable the one or more nodes in the graphical program, wherein disabling the one or more nodes prevents functionality implemented by the one or more nodes from being performed during execution of the graphical program, wherein association of the one or more nodes with the code disable structure comprises positioning the one or more nodes within the first area in response to user input;

store information representing the graphical program; and execute the graphical program, wherein the functionality implemented by the one or more nodes is not performed during execution of the graphical program.

98. The computer readable memory medium of claim 97, wherein associating the one or more nodes with the code disable structure is performed in response to user input.

99. The computer readable memory medium of claim 97, wherein the program instructions are executable to:

display the graphical program; and visually indicate that the one or more nodes are disabled.

100. The computer readable memory medium of claim 97, wherein the program instructions are further executable to:

compile the graphical program, wherein said compiling comprises generating executable program instructions operable to perform functionality of nodes in the graphical program that are not disabled, but not generating executable program instructions operable to perform functionality of nodes in the graphical program that are disabled.

101. The computer readable memory medium of claim 97, wherein the program instructions are further executable to:

compile the graphical program, wherein said compiling comprises generating executable program instructions operable to perform functionality of nodes in the graphical program that are not disabled without performing functionality of nodes in the graphical program that are disabled.

102. The method of claim 97, wherein said disabling the one or more nodes in the graphical program comprises programmatically disabling the one or more nodes.

103. The method of claim 97, further comprising:

including a first graphical program element in the graphical program;

wherein said associating the one or more of the nodes comprises associating the one or more nodes with the first graphical program element.

104. The method of claim 97, further comprising:
selecting the one or more nodes;
wherein said associating the one or more nodes comprises associating the one or more nodes in response to user input indicating a desire to disable the selected one or more nodes.

105. The computer readable memory medium of claim 97, wherein the program instructions are further executable to:
include a first graphical program element in the graphical program;
wherein said associating the one or more nodes with the code disable structure comprises associating the one or more nodes with the first graphical program element.

106. The computer readable memory medium of claim 97, wherein the graphical program is not executable to perform functionality associated with the one or more nodes.

107. The computer readable memory medium of claim 97, wherein said including the plurality of interconnected nodes in the graphical program comprises:
arranging a plurality of nodes on a display; and
interconnecting the plurality of nodes in response to user input.

108. The computer readable memory medium of claim 97, wherein the graphical program comprises a block diagram portion and a user interface portion.

109. The computer readable memory medium of claim 97, wherein the one or more nodes have functionality including one or more of:
industrial automation functionality;
process control functionality; and/or
test and measurement functionality;
wherein said associating the one or more nodes with the code disable structure operates to prevent the functionality of the one or more nodes from being performed during execution of the graphical program.

110. The computer readable memory medium of claim 97, wherein said storing information representing the graphical program comprises storing information indicating that the one or more nodes are disabled.

111. The computer readable memory medium of claim 97, wherein said positioning the one or more nodes within the first area in response to user input comprises positioning the code disable structure around the one or more nodes.

* * * * *

UNITED STATES PATENT AND TRADEMARK OFFICE
CERTIFICATE OF CORRECTION

PATENT NO. : 7,543,281 B2 Page 1 of 1
APPLICATION NO. : 10/200560
DATED : June 2, 2009
INVENTOR(S) : King et al.

It is certified that error appears in the above-identified patent and that said Letters Patent is hereby corrected as shown below:

In the Claims:

Column 18
Line 35, please delete "whenever preventing the first" and substitute -- wherein preventing the first portion of --.

Column 25
Line 55, please delete "wherein the fUnctionality includes" and substitute -- wherein the functionality includes --.

Signed and Sealed this

Fourteenth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO.          : 7,543,281 B2                                        Page 1 of 1
APPLICATION NO.     : 10/200560
DATED               : June 2, 2009
INVENTOR(S)         : King et al.

It is certified that error appears in the above-identified patent and that said Letters Patent is hereby corrected as shown below:

In the Claims:

Column 18
Line 35, please delete "whenever preventing the first" and substitute -- wherein preventing the first --.

Column 25
Line 55, please delete "wherein the fUnctionality includes" and substitute -- wherein the functionality includes --.

This certificate supersedes the Certificate of Correction issued July 14, 2009.

Signed and Sealed this

Twenty-second Day of September, 2009

David J. Kappos
*Director of the United States Patent and Trademark Office*